US009716386B2

(12) United States Patent
Honda et al.

(10) Patent No.: US 9,716,386 B2
(45) Date of Patent: Jul. 25, 2017

(54) CONTACTLESS POWER SUPPLY SYSTEM (71) Applicant: HEADS Co., Ltd., Miyako-gun, Fukuoka (JP)

(72) Inventors: Keiichi Honda, Miyako-gun (JP); Yutaka Imoto, Miyako-gun (JP)

(73) Assignee: HEADS CO., LTD., Fukuoka (JP)

( * ) Notice: Subject to any disclaimer, the term of this patent is extended or adjusted under 35 U.S.C. 154(b) by 81 days.

(21) Appl. No.: 14/416,743

(22) PCT Filed: Mar. 5, 2014

(86) PCT No.: PCT/JP2014/055632
§ 371 (c)(1),
(2) Date: Jan. 23, 2015

(87) PCT Pub. No.: WO2014/136839
PCT Pub. Date: Sep. 12, 2014

(65) Prior Publication Data
US 2015/0207332 A1    Jul. 23, 2015

(30) Foreign Application Priority Data

Mar. 6, 2013  (JP) ................................. 2013-044743

(51) Int. Cl.
*H02J 7/00* (2006.01)
*H01F 27/42* (2006.01)
(Continued)

(52) U.S. Cl.
CPC .............. *H02J 5/005* (2013.01); *B60L 11/182* (2013.01); *B60L 11/1824* (2013.01);
(Continued)

(58) Field of Classification Search
CPC ....... Y02T 90/10; Y02T 90/12; Y02T 90/122; Y02T 90/124; Y02T 90/125;
(Continued)

(56) References Cited

U.S. PATENT DOCUMENTS 5,839,554 A  *  11/1998  Clark ..................... B60L 5/005
                                                            191/10
2010/0277004 A1    11/2010  Suzuki et al.
(Continued)

FOREIGN PATENT DOCUMENTS

CN         102084440 A      6/2011
CN         102598471 A      7/2012
(Continued)

OTHER PUBLICATIONS

Notification of Reasons for Refusal dated Apr. 27, 2016, issued in counterpart Chinese Patent Application No. 201480001919.0, with English tranlsation. (10 pages).
(Continued)

*Primary Examiner* — Richard Isla Rodas
*Assistant Examiner* — Michael Dibenedetto
(74) *Attorney, Agent, or Firm* — Westerman, Hattori, Daniels & Adrian, LLP (57) ABSTRACT

In a contactless power supply system 10 having a secondary coil 13 receiving electric power generated from a primary coil 12 to be connected to a high-frequency power source 11, and a resonance coil 14 arranged in direct contact with the secondary coil 13 in between the primary coil 12 and the secondary coil 13, respective planarly-viewed areas of the secondary and the resonance coils 13, 14 are equal to or smaller than a planarly-viewed area of the primary coil 12, the primary coil 12 is formed by planarly and spirally winding a first litz wire 25, the resonance coil 14 is formed by tandemly winding coils 27, 28 in a double layer, the coils 27, 28 being formed by planarly and spirally winding a second litz wire 26, and the secondary coil 13 is formed by parallelly arranging and planarly and spirally winding third litz wires 29, 29a.

8 Claims, 6 Drawing Sheets

(51) Int. Cl.
  *H01F 37/00* (2006.01)
  *H01F 38/00* (2006.01)
  *H02J 5/00* (2016.01)
  *H01F 38/14* (2006.01)
  *B60L 11/18* (2006.01)
  *H02J 7/02* (2016.01)
  *B60M 7/00* (2006.01)

(52) U.S. Cl.
  CPC ............ *H01F 38/14* (2013.01); *H02J 7/025* (2013.01); *B60M 7/003* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/14* (2013.01)

(58) Field of Classification Search
  CPC ...... Y02T 90/127; Y02T 90/128; H02J 50/05; H02J 50/10; H02J 50/12; H02J 50/50; H02J 7/00; H02J 7/02; H02J 7/0027; H02J 17/00; H02J 5/00; H02J 5/005
  USPC ......... 320/108, 109; 307/104; 336/180, 183, 336/223, 232
  See application file for complete search history.

(56) References Cited

U.S. PATENT DOCUMENTS

| | | | |
|---|---|---|---|
| 2011/0102125 A1* | 5/2011 | Tamura | H01F 27/2871 336/232 |
| 2011/0198940 A1 | 8/2011 | Urano | |
| 2011/0309689 A1 | 12/2011 | Kamata | |
| 2012/0049791 A1 | 3/2012 | Tanabe | |
| 2012/0056485 A1* | 3/2012 | Haruyama | H02J 5/005 307/104 |
| 2012/0112552 A1 | 5/2012 | Baarman et al. | |
| 2012/0161530 A1 | 6/2012 | Urano | |
| 2012/0223594 A1 | 9/2012 | Gotani | |
| 2012/0274270 A1* | 11/2012 | Dinsmoor | A61N 1/3787 320/108 |
| 2013/0088087 A1* | 4/2013 | Yamamoto | B60L 11/182 307/104 |
| 2013/0169062 A1* | 7/2013 | Maikawa | H02J 50/10 307/104 |
| 2013/0257362 A1* | 10/2013 | Lim | H01Q 7/00 320/108 |
| 2015/0318714 A1 | 11/2015 | Kamata | |

FOREIGN PATENT DOCUMENTS

| | | |
|---|---|---|
| JP | 3442937 B2 | 9/2003 |
| JP | 2009-158598 A | 7/2009 |
| JP | 4318742 B1 | 8/2009 |
| JP | 2010-016235 A | 1/2010 |
| JP | 2010-273441 A | 12/2010 |
| JP | 2011-86890 A | 4/2011 |
| JP | 2011-229202 A | 11/2011 |
| JP | 2012-023949 A | 2/2012 |
| JP | 2012-055045 A | 3/2012 |
| JP | 2012-119496 A | 6/2012 |
| JP | 2012-120410 A | 6/2012 |
| JP | 2012-143131 A | 7/2012 |
| JP | 2012-517118 A | 7/2012 |
| JP | 2012-249401 A | 12/2012 |
| WO | 2010/090539 A1 | 8/2010 |
| WO | 2012/157115 A1 | 11/2012 |

OTHER PUBLICATIONS

Extended (Supplementary) European Search Report dated Mar. 29, 2016, issued in counterpart European Patent Application No. 14760172.8. (10 pages).

International Search Report dated May 13, 2014, issued in corresponding application No. PCT/JP2014/055632.

Notice of Submission of Opinion dated Aug. 5, 2016, issued in counterpart Korean Patent Application No. 10-2015-7001610, with English translation. (9 pages).

Office Action dated Feb. 14, 2017, issued in counterpart Japanese Application No. 2015-006904, with English translation (8 pages).

\* cited by examiner

CONTACTLESS POWER SUPPLY SYSTEM

TECHNICAL FIELD

The present invention relates to a contactless power supply system that has a primary coil, and a resonance coil and a secondary coil to be arranged at a distance from the primary coil, and that contactlessly sends electric power from the primary coil to the secondary coil, and the present invention especially relates to a contactless power supply system in which efficiency of power supply from a primary coil to a secondary coil has been improved.

BACKGROUND ART

As a system for contactlessly sending electric power to service vehicles and cars in a factory, as described in Patent Literature 1, there is proposed a contactless power supply system in which electric power is sent from a primary coil to a secondary coil by arranging the primary coil and the secondary coil with a space in between and providing a resonance coil (tertiary coil) having a capacitor for resonance connected thereto on a secondary side.

Also, in Patent Literature 2, there is proposed a contactless power supply system for a ground moving body in which rise in voltage of pickup coils is regulated by regarding a power feed line arranged along a travel path as a primary side, regarding pickup coils wound around iron cores provided to a ground moving body as a secondary side, forming a resonance circuit by parallelly connecting a resonance capacitor to output terminals of the pickup coils, parallelly connecting a saturable reactor to the pickup coils, self-inductance of the saturable reactor lowering by being magnetically saturated upon rising of voltage of the pickup coils, and increasing electric current flowing to the saturable reactor in association with lightening of weight of a load.

CITATION LIST

Patent Literature

Patent Literature 1: Japanese Patent No. 4318742
Patent Literature 2: Japanese Patent No. 3442937

SUMMARY OF INVENTION

Technical Problem

However, in a technique described in Patent Literature 1, there is a problem of inefficiency in electric power to be supplied from the primary coil to the secondary coil.
Additionally, when contactlessly supplying a large amount of electric power, there is a problem in that heat generation in the primary coil due to resistance loss and eddy-current loss increases, and electric current flowing to the resonance coil also increases, which makes the resonance coil generate excessive heat, and also causes electric power consumption due to resistance existing on the resonance circuit.

Moreover, in a technique described in Patent Literature 2, since the distance between the power feed line and the pickup coils is nearly constant, magnetic connection between the power feed line and the pickup coils is constant. In Patent Literature 2, since overvoltage becomes generated in the pickup coils at the time of lightening of weight of a load, in order to prevent this, a saturable reactor that becomes self-saturated by overvoltage is used. However, a problem to be solved in Patent Literature 2 is different from that in the present invention, and in Patent Literature 2, a resonance coil is not used aside from the pickup coils, and thus a structure thereof is also different from that of the present invention.

The present invention has been made in view of the above circumstances, and an object thereof is to provide a contactless power supply system in which electric power is efficiently supplied to a secondary-side circuit having a resonance circuit (resonance coil) independently from a secondary coil, and in which heat generation and loss in a primary coil, the secondary coil, and the resonance coil are reduced.

Solution to Problem

In order to achieve the above object, according to a first aspect of the present invention, there is provided a contactless power supply system including a primary coil to be connected to a high-frequency power source, a secondary coil to receive electric power generated from the primary coil, and a resonance coil arranged in direct contact with the secondary coil in between the primary coil and the secondary coil, wherein
respective planarly-viewed areas of the secondary coil and the resonance coil are equal to or smaller than a planarly-viewed area of the primary coil,
the primary coil is formed by planarly and spirally winding a first litz wire, the resonance coil is formed by tandemly winding coils in a double layer, the coils being formed by planarly and spirally winding a second litz wire, and in the case of the secondary coil, two third litz wires are parallelly arranged and planarly and spirally wound.

According to a second aspect of the present invention, in the contactless power supply system of the first aspect of the present invention, the first litz wire of the primary coil, each wind of which adjacent to one another, is arranged at intervals (e.g., 1 to 5 mm).

According to a third aspect of the present invention, in the contactless power supply systems of the first and second aspects of the present invention, the primary coil, the secondary coil and the resonance coil are formed in an outlined rectangular shape (an oblong or a square shape) with corner portions thereof having a roundish shape in planar view.

According to a fourth aspect of the present invention, in the contactless power supply system of the third aspect of the present invention, the contactless power supply system is for charging a battery of a service vehicle moving inside a factory, the primary coil is to be arranged along a lane of the service vehicle, and the secondary coil and the resonance coil are to be mounted on the service vehicle.

According to a fifth aspect of the present invention, in the contactless power supply system of the fourth aspect of the present invention, output from the secondary coil becomes rectified and charges the battery, and an adjustment of the charging current is performed by controlling electric current flowing to the resonance coil.

According to a sixth aspect of the present invention, in the contactless power supply systems of the fourth and fifth aspects of the present invention, 1) respective dimensions of the primary coil, the secondary coil, and the resonance coil along a width of the lane are in the range of 350 to 600 mm in planar view, 2) a length of the primary coil along the lane is in the range of 350 to 800 mm in planar view, and 3) lengths of the secondary coil and the resonance coil along the lane are in the range of 350 to 650 mm in planar view.

According to a seventh aspect of the present invention, in the contactless power supply systems of the first to sixth aspects of the present invention, a plurality of rod-like ferrite cores are provided on the back of the primary coil in a state of crossing a winding wire of the primary coil. It is preferable for the rod-like ferrite cores to be rectangular in cross-section.

According to an eighth aspect of the present invention, in the contactless power supply system of the seventh aspect of the present invention, an aluminum plate holding the primary coil and the rod-like ferrite cores and having a plate thickness of 3 to 10 mm is provided on the back of the rod-like ferrite cores.

Advantageous Effects of Invention

In the case of the contactless power supply system according to the present invention, since litz wires are used for the primary coil, the secondary coil and the resonance coil, even when high frequency current flows, skin effect does not occur easily. Therefore, power loss lessens, which makes the contactless power supply system efficient.

Additionally, since the respective planarly-viewed areas of the secondary coil and the resonance coil are equal to or smaller than the planarly-viewed area of the primary coil, leakage magnetic flux decreases, enabling to efficiently supply electric power.

Since the resonance coil is formed by tandemly winding the coils in a double layer, the coils being formed by planarly and spirally winding the litz wire, it is possible to form the resonance coil compactly by increasing the number of turns.

Especially, in the case of the primary coil, when the litz wire is arranged at intervals, cooling effect becomes enhanced, and interference among the litz wire decreases as well.

Additionally, when the shapes of the primary coil, the secondary coil and the resonance coil are made to be a rectangle with corner portions thereof having a roundish shape, a comparatively large area can be secured in accordance with widths and traveling of a service vehicle, a car and the like, improving transmitting efficiency.

When arranging rod-like ferrite cores on the back of the primary coil, leakage magnetic flux occurring due to the primary coil can be lessened, power loss can be alleviated, and transmitting efficiency can be improved at the same time.

Additionally, when providing an aluminum plate having a plate thickness of 3 to 10 mm on the back of the rod-like ferrite cores, the primary coil and the rod-like ferrite cores can be assembled on or under the aluminum plate, and the aluminum plate also works effectively as a supporting member for the primary coil.

DESCRIPTION OF EMBODIMENTS

Next, with reference to the accompanying drawings, descriptions will be given on embodiments of the present invention.

Figure 2:
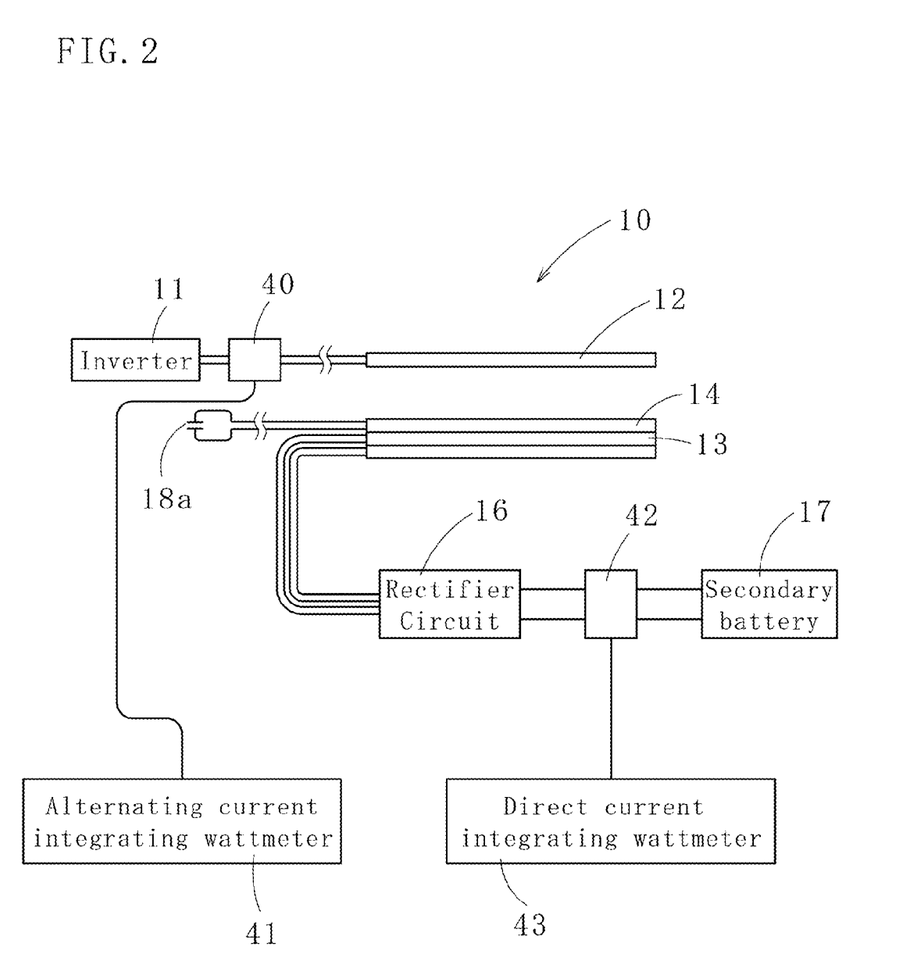
FIG. 2 is a layout drawing of the same contactless power supply system on which an examination has been performed for the confirmation of function effects.
Figure 5:
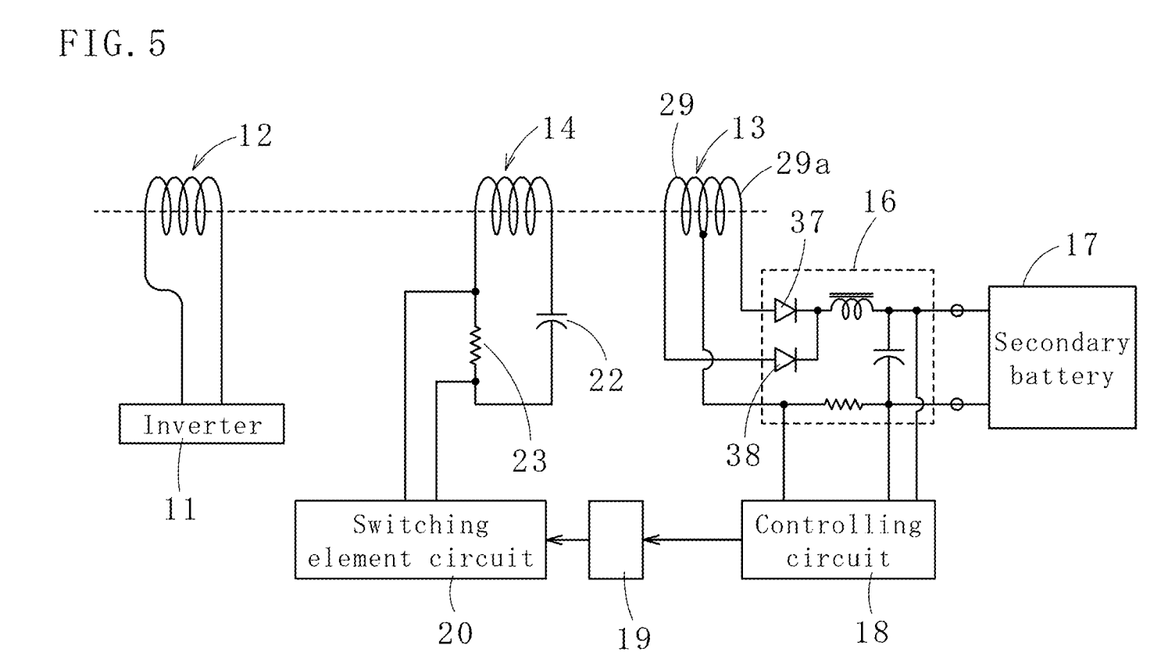
FIG. 5 is a general block diagram of the same contactless power supply system.

As illustrated in FIGS. 2 and 5, a contactless power supply system 10 according to one embodiment of the present invention includes a primary coil 12 to be connected to a high-frequency power source 11 consisting of an inverter (preferably, of 8 to 50 kHz), a secondary coil 13 to receive electric power generated from the primary coil 12, and a resonance coil 14 arranged in direct contact or contiguity with the secondary coil 13 in between the primary coil 12 and the secondary coil 13.

A rectifier circuit 16 is connected to the secondary coil 13, and output from the secondary coil 13 is converted to direct current and supplied to a secondary battery 17 which is a load. Electric voltage and electric current of direct current rectified by the rectifier circuit 16 are detected and input into a controlling circuit 18. The detected electric voltage and electric current of the direct current are digitally processed in the controlling circuit 18, and through a photocoupler 19, supplied to a switching element circuit 20.

In the switching element circuit 20, by generating on-signals and off-signals to be divided based on a duty ratio, increasing and decreasing of electric current flowing through the resonance coil 14 are performed. A capacitor 22 and a resistance 23 are tandemly connected to the resonance coil 14.

Figure 6:
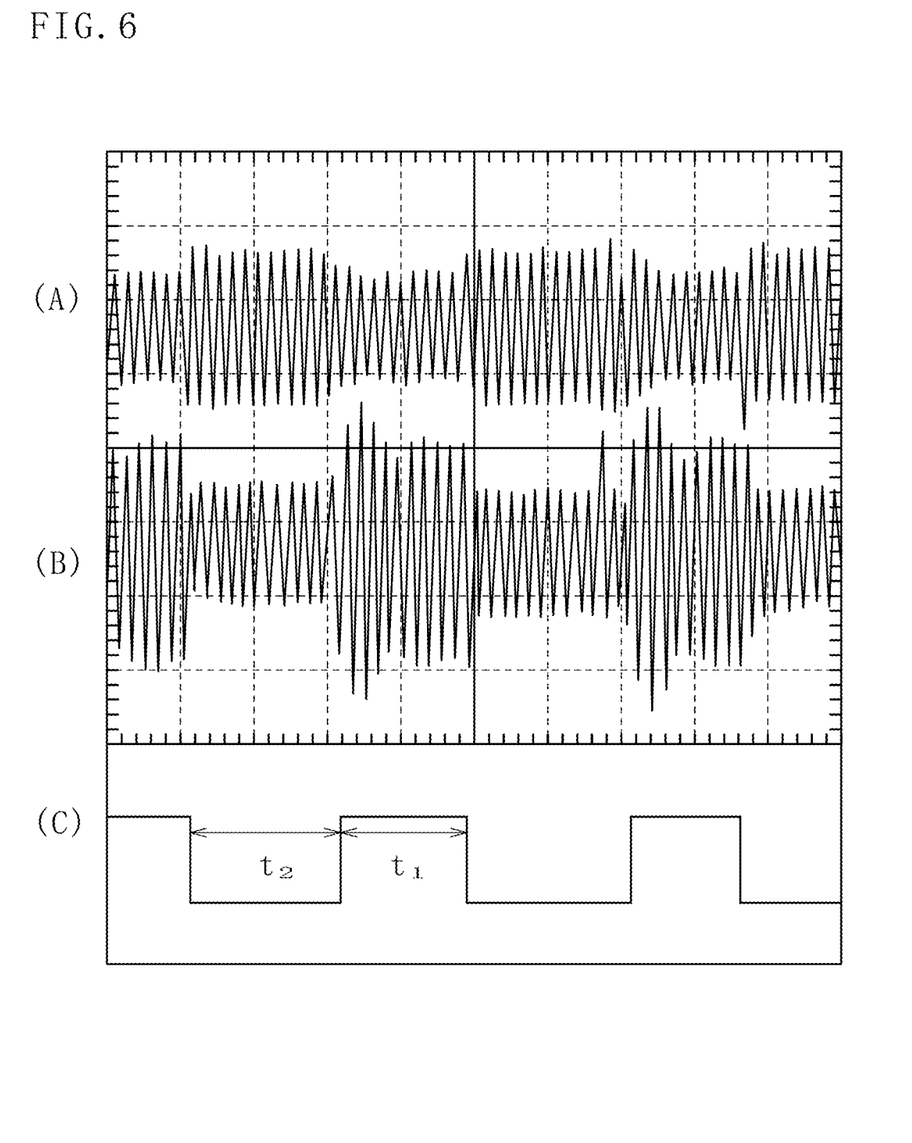
FIGS. 6(A) to 6(C) are waveform charts each illustrating an operating condition of the same contactless power supply system.

When illustrating this state in FIG. 6(C), during a period of t2, the switching element circuit 20 is turned off and only the resistance 23 is tandemly connected to the resonance coil 14. However, during a period of t1, the switching element circuit 20 is turned on, and a different resistance is applied in parallel with the resistance 23. Thus, by changing the ratio of lengths of t1 and t2, resonance current can be controlled.

Since electric current flowing into the resonance coil 14 and electric current flowing through the secondary coil 13 increase linearly, by detecting output current of the rectifier circuit 16 and feeding back the detected output current of the rectifier circuit 16 to the resonance coil 14, electric current passing through the rectifier circuit 16 can be kept constant (or at a constant value or less).

Also, by detecting output voltage of the rectifier circuit 16 by the controlling circuit 18 and feeding back the detected output voltage, the output voltage of the rectifier circuit 16 can be controlled to be at a constant value or less. When the secondary battery 17 becomes close to being fully charged, electric voltage increases. Thus, by detecting this, charging current can be reduced or even made to be at zero.

FIG. 6(A) illustrates output voltage of the high-frequency power source 11; and

FIG. 6(B) illustrates electric current flowing through the resonance coil 14.

Additionally, a capacitor for resonance 18a is tandemly connected to the resonance coil 14, and electric current flowing through the resonance coil 14 is made to resonate with oscillating frequency f of the high-frequency power source (an inverter) 11. By adjusting the capacitor for resonance 18a, resonance frequency f1 formed by the resonance coil 14 and the capacitor for resonance 18a can also be made to be (0.9 to 1.05) f.

Next, descriptions will be given on the primary coil 12 attached to a fixed object (e.g., fixed to a building or arranged along a lane of a service vehicle), and the secondary coil 13 and the resonance coil 14 to be mounted on a vehicle driven by the secondary battery 17 (e.g., a service vehicle moving inside a factory). When charging the secondary battery 17, a vehicle becomes parked at a specific location, and as illustrated in FIG. 2, the resonance coil 14 and the secondary coil 13 fixed to the vehicle become faced with the primary coil 12 attached to a ceiling portion (see the upper half of FIG. 2). It is preferable for respective planarly-viewed areas of the secondary coil 13 and the resonance coil 14 to be equal to or smaller than a planarly-viewed area of the primary coil 12, and it is also preferable for the primary coil 12 to cover the resonance coil 14.

Figure 3A:
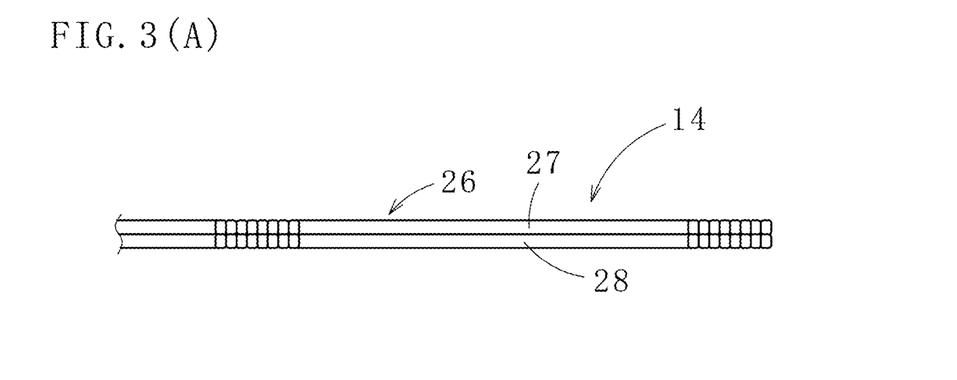
FIG. 3(A) is a side view of a resonance coil of the same contactless power supply system; and 3(B) is a plan view of the same resonance coil.
Figure 3B:
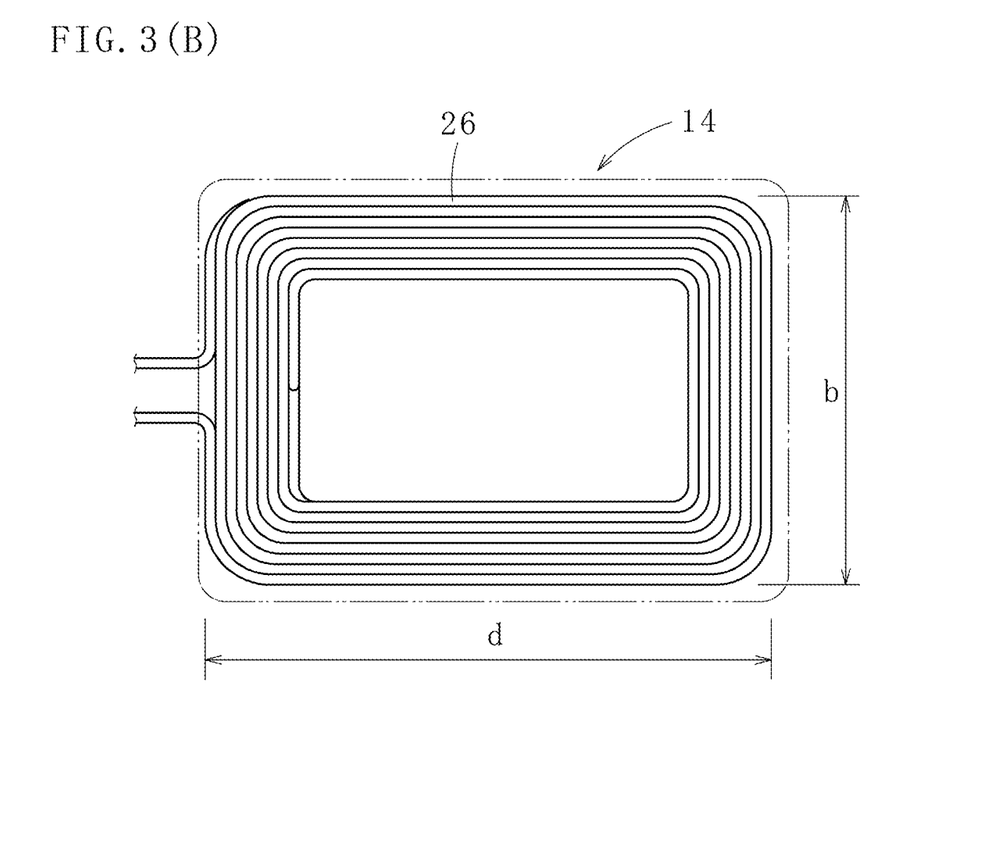
Figure 4:
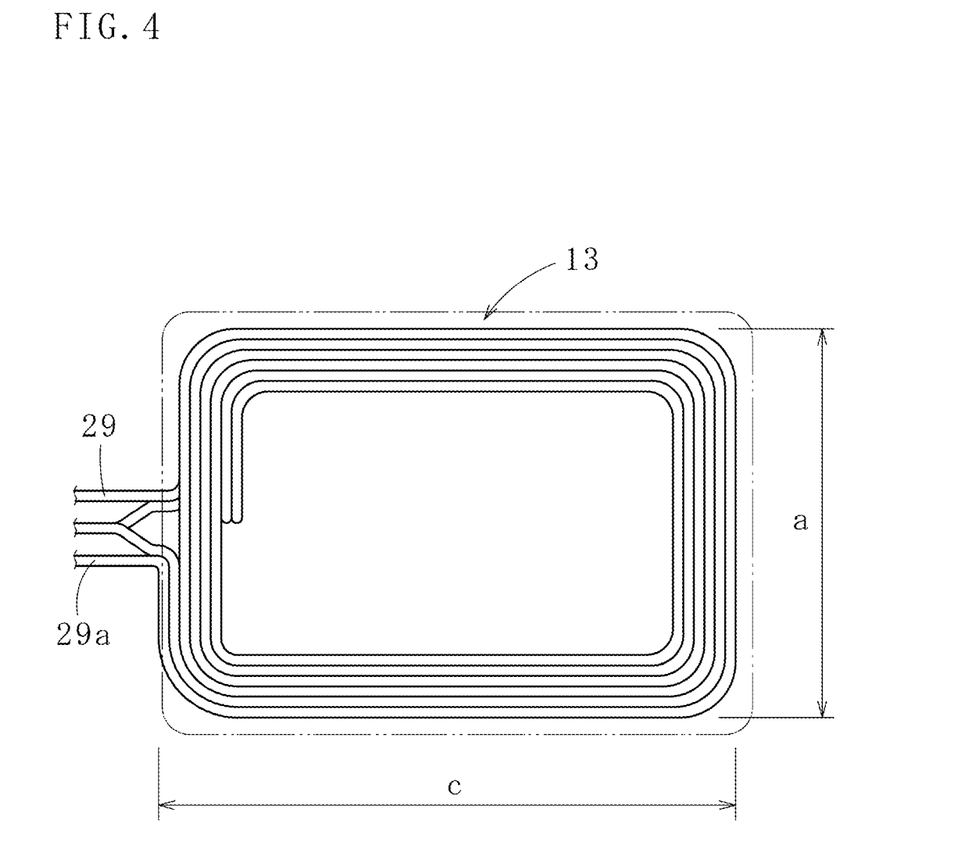
FIG. 4 is a plan view of a secondary coil of the same contactless power supply system.

The planarly-viewed secondary coil 13 and the planarly-viewed resonance coil 14 have an outlined rectangular shape with arc-like corner portions (rounded), have the same forms and areas, and are arranged in a stacked state. In the case of the planarly-viewed secondary coil 13 and the planarly-viewed resonance coil 14, in FIGS. 3(A), 3(B) and 4, widths a and b are in the range of 350 to 600 mm, and lengths c and d are in the range of 350 to 650 mm.

Figure 1A:
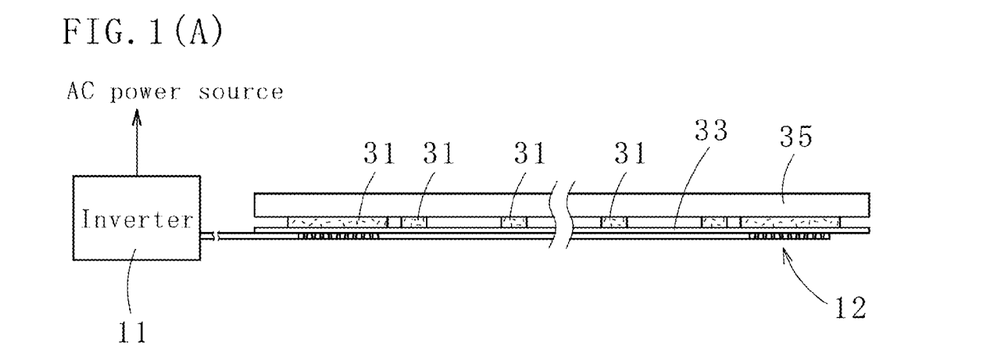
FIG. 1(A) is a side view of a primary coil used for a contactless power supply system according to one embodiment of the present invention; and 1(B) is a plan view of the same primary coil.
Figure 1B:
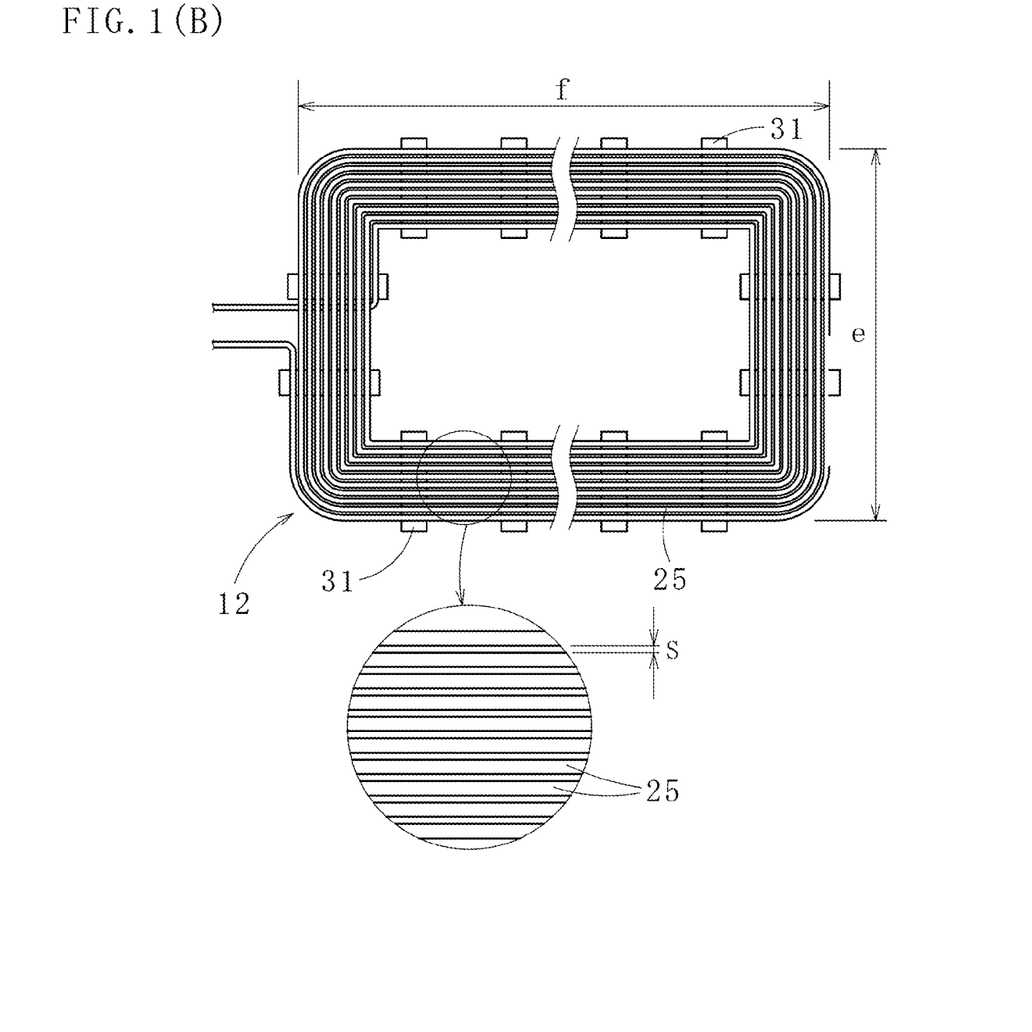

On the other hand, as illustrated in FIGS. 1(A) and 1(B), a width e of the primary coil 12 consisting of an outlined rectangle with arc-like corner portions in planar view is in the range of 350 to 600 mm, and a length f thereof is in the range of 350 to 800 mm.

Additionally, the lengths mean lengths with respect to a moving direction of the vehicle (i.e., lengths along the lane of the vehicle), and the widths mean lengths in a direction perpendicular to the lengths (i.e., lengths along a width of the lane).

The primary coil 12 is formed by planarly and spirally winding a first litz wire 25, the resonance coil 14 is formed by tandemly winding coils 27 and 28 in a double layer, the coils 27 and 28 being formed by planarly and spirally winding a second litz wire 26, and in the case of the secondary coil 13, two third litz wires 29 and 29a are parallelly arranged and planarly and spirally wound. Thicknesses of the first to third litz wires 25, 26, 29 and 29a are determined by flowing electric current, however, when charging the second battery 17 of the vehicle in a factory, for example, it is preferable to adopt those of 100 A specifications (with a diameter of about 8 to 9 mm, and 14 to 22 SQ).

As illustrated in FIGS. 1(A) and 1(B), on the back of the primary coil 12, a plurality of rod-like ferrite cores 31 are provided at intervals of about 10 to 50 mm in a state of crossing a winding wire (the first litz wire 25) of the primary coil 12. These rod-like ferrite cores 31 completely cover the winding wire, and also stick out toward the inner and outer sides of the winding wire. This prevents magnetic field generated by the primary coil 12 from leaking on the back side of the primary coil 12 as much as possible.

Between winds of a winding wire of the primary coil 12, each wind of which adjacent to one another, i.e., between winds of the first litz wire 25, spaces S are provided, which prevent interference among the first litz wire 25 as much as possible. Each of the spaces S is, for example, about 2 to 5 mm.

The primary coil 12 is fixed on an insulating plate (e.g., a glass epoxy board) 33, the rod-like ferrite cores 31 are provided on the back of the insulating plate 33, and an aluminum plate 35 of 3 to 10 mm (preferably, 5 to 8 mm) is provided on the back of the rod-like ferrite cores 31 on the back of the insulating plate 33. This aluminum plate 35 is for fortifying the whole of the primary coil 12 through the rod-like ferrite cores 31, and can be fixed with screws to a ceiling, a wall and the like of a building.

The secondary coil 13 is, as illustrated in FIG. 5, formed by winding twisted or parallelly-arranged two litz wires 29 and 29a (the third litz wires). The litz wires 29 and 29a on one side are connected and used as a center tap, composing the rectifier circuit 16 consisting of two diodes 37 and 38.

Next, with reference to FIG. 2, descriptions will be given on an example of an experiment performed to confirm the functions and effects of the present invention.

As illustrated in FIG. 2, in the case of the primary coil 12, a width e is 400 mm, a length f is 600 mm (see FIG. 1), and the first litz wire 25 having a diameter of 8 to 9 mm was planarly and spirally wound ten turns.

The resonance coil 14 was arranged right below the primary coil 12, and the secondary coil 13 was arranged in contact with the resonance coil 14. An interval between the resonance coil 14 and the primary coil 12 was 50 mm. Plane dimensions of the resonance coil 14 and the secondary coil 13 were the same, and the widths a and b were 400 mm and the lengths were 600 mm. The resonance coil 14 is made to be a double layer by connecting coils 27 and 28 in series, these coils 27 and 28 each being formed by winding eight turns of the second litz wire (a diameter of 8 to 9 mm) 26.

The secondary coil 13 was made by superposing or twisting and planarly and spirally winding the third litz wires 29 and 29a, and the number of coil turns was three. As illustrated in FIG. 2, as a result of measuring after providing a terminal box 40 on the near side of the primary coil 12 and connecting an alternating current integrating wattmeter 41, and providing a terminal box 42 on an output side of the rectifier circuit 16 and connecting a direct current integrating wattmeter 43, electric power on the side of alternating current was 4.591 kw, and electric power on the side of direct current was 3.504 kw. Therefore, when simply calculating an efficiency (n), the efficiency is 76%, however, in actuality, by adjusting the interval between the primary coil 12 and the secondary coil 13, it becomes possible for the efficiency to be up to about 70 to 90%. Also, the oscillating frequency of the high-frequency power source was 10 kHz.

Due to the above matters, litz wires are used for the primary coil, the secondary coil and the resonance coil. Therefore, the efficiency of the contactless power supply system is made to be enhanced by avoiding loss (intrinsic deflection) due to eddy current as much as possible.

The present invention is not limited to the above embodiments, and the structure thereof can be changed within the scope which does not alter the gist of the present invention. For example, in this embodiment, a primary-side resonance coil is not provided to the primary coil, however, it can be provided as needed. In this case, since electric power is consumed by the primary-side resonance coil, it would appear that the efficiency becomes lowered, however, the interval between the primary coil and the secondary coil can be made wider.

INDUSTRIAL APPLICABILITY

In the case of the contactless power supply system according to the present invention, since the coefficient of use of a conductor is high, loss is relatively little, and when applied to, for example, an automobile, an in-plant vehicle, other moving trucks and the like, electric power can be supplied to them contactlessly and efficiently.

REFERENCE SIGNS LIST

10: contactless power supply system, 11: high-frequency power source, 12: primary coil, 13: secondary coil, 14: resonance coil, 16: rectifier circuit, 17: secondary battery, 18: controlling circuit, 18a: capacitor for resonance, 19: photocoupler, 20: switching element circuit, 22: capacitor, 23: resistance, 25: first litz wire, 26: second litz wire, 27, 28: coil, 29, 29a: third litz wire, 31: rod-like ferrite core, 33: insulating plate, 35: aluminum plate, 37, 38: diode, 40: terminal box, 41: alternating current integrating wattmeter, 42: terminal box, 43: direct current integrating wattmeter

The invention claimed is:

1. A contactless power supply system, comprising:
a primary coil to be connected to a high-frequency power source;
a secondary coil to receive electric power generated from the primary coil;
a resonance coil arranged in direct contact with the secondary coil in between the primary coil and the secondary coil; and
a rectifier circuit to convert output generated in the secondary coil to direct current, wherein
respective planarly-viewed areas of the secondary coil and the resonance coil are equal to or smaller than a planarly-viewed area of the primary coil,
the primary coil is formed by planarly and spirally winding a first litz wire,
the resonance coil is formed by winding coils in series in a double layer,
the coils being formed by planarly and spirally winding a second litz wire,
in the case of the secondary coil, two third litz wires are parallelly arranged and planarly and spirally wound, and
the contactless power supply system is for charging a battery of a service vehicle moving inside a factory, the primary coil is to be arranged along a lane of the service vehicle, and the secondary coil and the resonance coil are to be mounted on the service vehicle.

2. The contactless power supply system according to claim 1, wherein the first litz wire of the primary coil, each wind of which adjacent to one another, is arranged at intervals.

3. The contactless power supply system according to claim 1, wherein the primary coil, the secondary coil and the resonance coil are formed in an outlined rectangular shape with corner portions thereof having a roundish shape in planar view.

4. The contactless power supply system according to claim 1, wherein
1) respective dimensions of the primary coil, the secondary coil, and the resonance coil along a width of the lane are in the range of 350 to 600 mm in planar view,
2) a length of the primary coil along the lane is in the range of 350 to 800 mm in planar view, and 3) lengths of the secondary coil and the resonance coil along the lane are in the range of 350 to 650 mm in planar view.

5. The contactless power supply system according to claim 1, wherein
a plurality of rod-like ferrite cores are provided on the back of the primary coil in a state of crossing a winding wire of the primary coil.

6. The contactless power supply system according to claim 5, wherein
an aluminum plate holding the primary coil and the rod-like ferrite cores and having a plate thickness of 3 to 10 mm is provided on the back of the rod-like ferrite cores.

7. The contactless power supply system according to claim 1, wherein
a capacitor and a resistance are tandemly connected to the resonance coil,
a switching element circuit is parallelly connected to the resistance, and
by detecting output current and output voltage of the rectifier circuit by a controlling circuit, feedback control that changes a duty ratio of ons and offs of the switching element circuit is performed so as to control each of the output current and the output voltage of the rectifier circuit to be at a constant value or less.

8. The contactless power supply system according to claim 1, wherein
respective planarly-viewed areas of the secondary coil and the resonance coil are smaller than a planarly-viewed area of the primary coil.

* * * * *